United States Patent [19]
Johnson et al.

[11] 3,911,540
[45] Oct. 14, 1975

[54] TOOL INTERCHANGE SYSTEM WITH BREAK-AWAY SHOES

[75] Inventors: Earl E. Johnson; Calvin Gladoske, both of North Fond du Lac, Wis.

[73] Assignee: Giddings & Lewis, Inc., Fond du Lac, Wis.

[22] Filed: Mar. 16, 1973

[21] Appl. No.: 341,971

[52] U.S. Cl. .................... 29/26 A; 29/568; 211/1.5
[51] Int. Cl.² ......................................... B23Q 3/155
[58] Field of Search ............ 29/26 A, 568; 211/1.5, 211/60 T, 69

[56] References Cited
UNITED STATES PATENTS

| | | | |
|---|---|---|---|
| 3,191,260 | 6/1965 | Jorgensen | 29/26 A |
| 3,263,300 | 8/1966 | Schatzman et al. | 29/26 A |
| 3,526,033 | 9/1970 | Saunders | 29/568 |
| 3,662,442 | 5/1972 | Noa | 29/26 A |

*Primary Examiner*—Donald R. Schran
*Assistant Examiner*—Z. R. Bilinsky
*Attorney, Agent, or Firm*—Wolfe, Hubbard, Leydig, Voit & Osann, Ltd.

[57] ABSTRACT

A machine tool having automatic tool changing apparatus including a tool storage magazine formed with a plurality of circumferentially spaced socket recesses each having a generally U-shaped tool support shoe that is adapted to be broken away from the magazine to prevent damage to the tool changing apparatus in the event of unintended overtravel of the tool transfer mechanism at the magazine during a tool change operation. Limit switch means are provided for interrupting the feed drive of the machine in the event of such unintended overtravel of the tool transfer mechanism.

14 Claims, 5 Drawing Figures

U.S. Patent  Oct. 14, 1975  Sheet 3 of 3  3,911,540
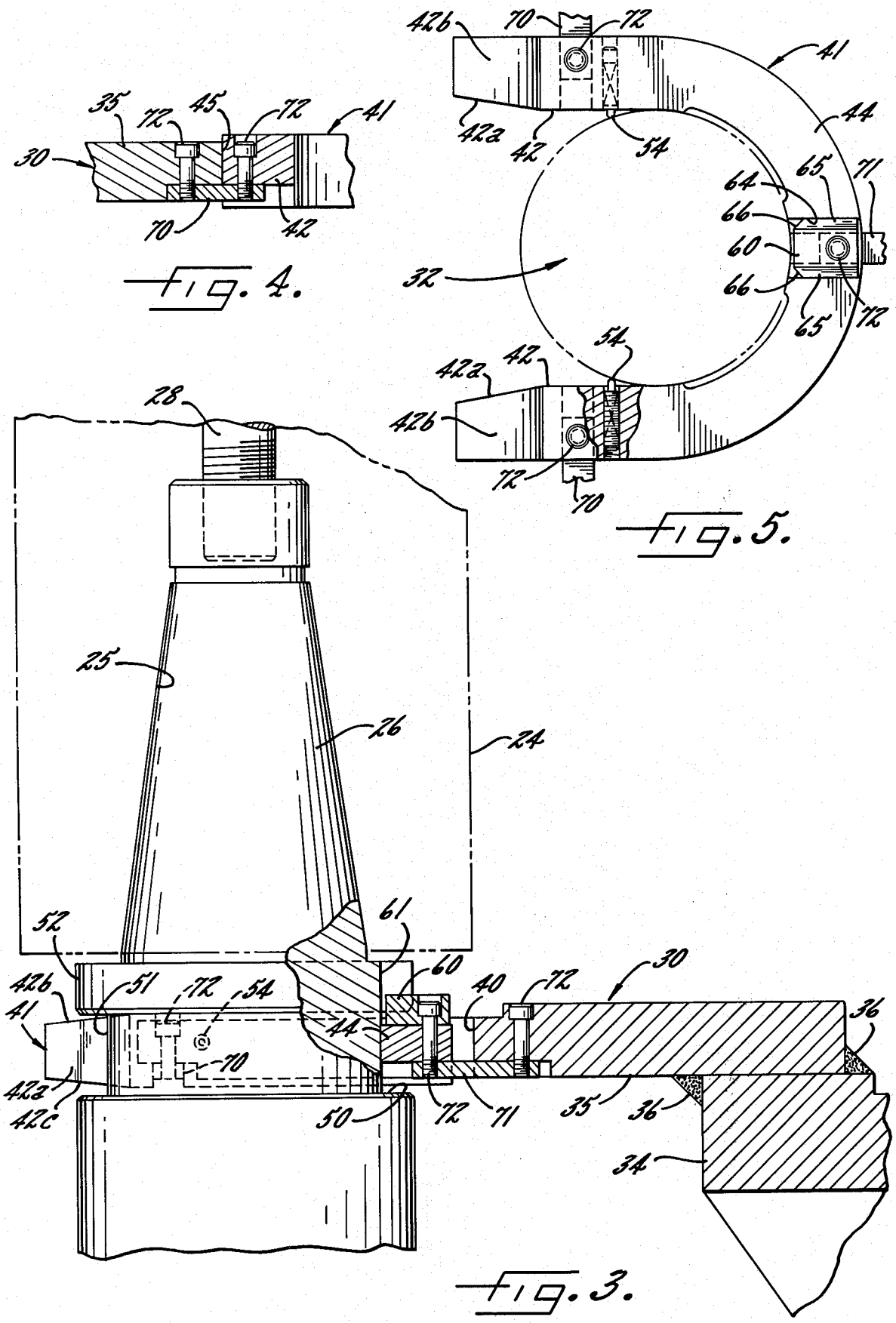

3,911,540

TOOL INTERCHANGE SYSTEM WITH BREAK-AWAY SHOES

DESCRIPTION OF THE INVENTION

The present invention relates to machine tools and more particularly to machine tools with automatic tool changing apparatus.

The invention is particularly, but not exclusively, applicable to vertical lathes which include a tool storage magazine containing a plurality of different tools and a tool carrying ram capable of being selectively moved to the magazine for returning one tool and engaging another. When such machines are automatically operated from punched or magnetic tape, it is important that the various machine movements be precisely controlled, particularly during a tool change cycle. Nevertheless, malfunctions occur both by reason of human errors, such as in programming of the machine, as well as because of mechanical failures or inaccuracies. If a malfunction occurs in the course of a tool change operation and the ram or like tool transfer mechanism overtravels at the storage magazine, costly damage can result to the machine and its productiveness can be lost for prolonged periods while the damage is repaired.

It is an object of the present invention to provide a tool interchange system for an automatically controlled machine tool which is adapted to eliminate or reduce damage to the machine as the result of a malfunction during a tool transfer at the storage magazine.

Another object is to provide a tool interchange system as characterized above which has a tool storage magazine with tool support means that permits unintended overtravel of the tool transfer mechanism at the magazine without seriously damaging the tool changing apparatus.

A further object is to provide a tool interchange system of the above kind which is adapted to automatically shut off the machine in the event the tool transfer mechanism overtravels the tool storage magazine.

Still another object is to provide a tool interchange system of the type set forth above in which the tool storage magazine has sockets which are adapted to guide and precisely orient a tool received during a tool change operation.

Other objects and advantages of the invention will become apparent upon reading the following detailed description and upon reference to the drawings, in which:

FIG. 3 is an enlarged fragmentary section taken in plane of line 3—3 in FIG. 2 and showing the machine ram in phantom;

FIG. 4 is an enlarged section taken in the plane of line 4—4 in FIG. 2; and

FIG. 5 is an enlarged plan view of one of the break-away tool support shoes of the tool storage magazine shown in FIG. 2.

Figure 1:
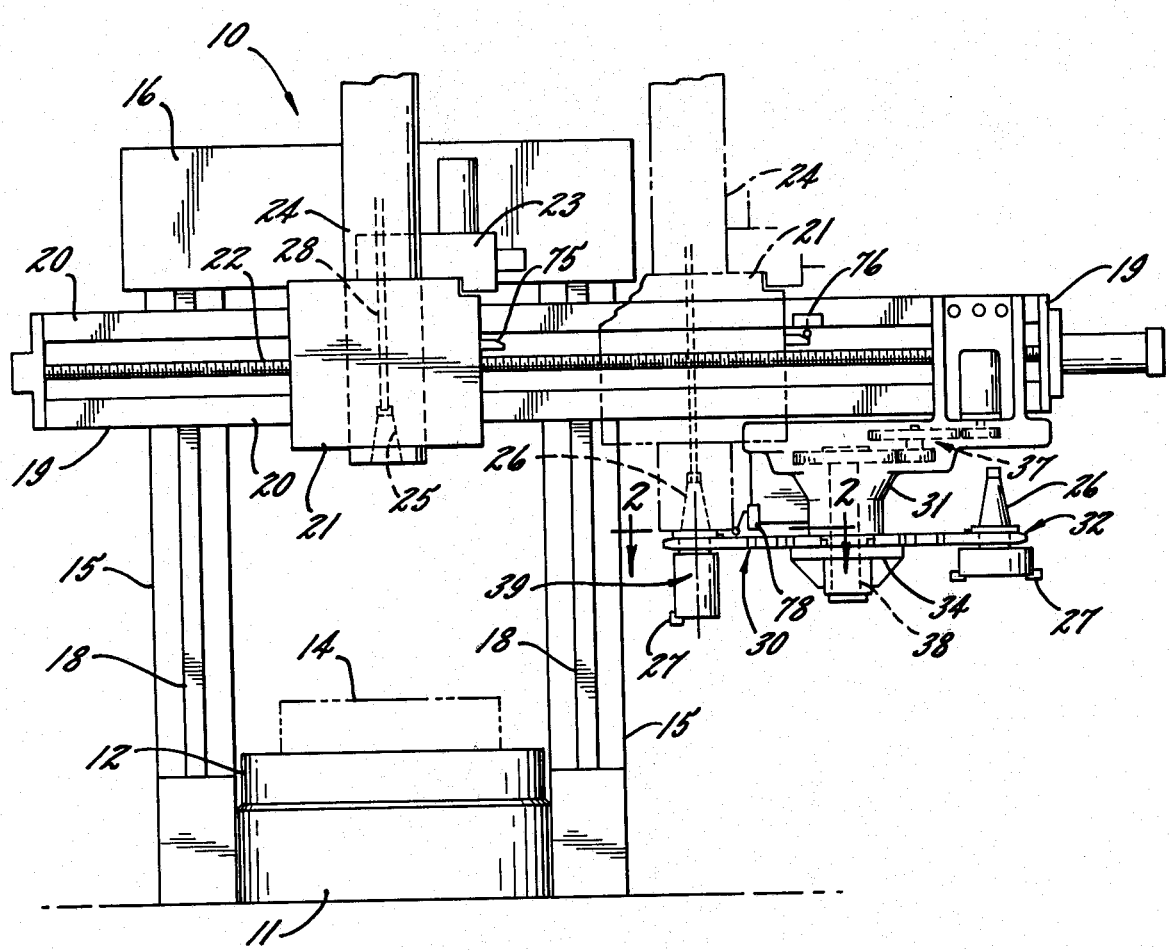
FIG. 1 is a partially diagrammatic front elevation view of a vertical lathe having a tool interchange system embodying the present invention with the machine head stock shown in solid lines in one position above the worktable and in phantom lines at a tool exchange position.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention.

Referring now to the drawings, the invention is there illustrated in a vertical lathe 10 which, in general terms, includes a base 11 with a power driven rotary table 12 capable of rigidly supporting a workpiece 14. Extending up from opposite sides of the base 11 are columns 15 which are connected at their upper ends by a crosspiece 16 and formed with vertical guideways 18 for supporting a vertically adustable cross rail 19. The cross rail has horizontal guideways 20 which slidably support a saddle 21 for movement in a horizontal direction in response to rotation of a power driven lead screw 22. The saddle 21, in turn, slidably supports a tool carrying ram 24 that is vertically movable through operation of a ram drive unit 23. The lower end portion of the ram 24 has a tapered socket 25 for receiving a correspondingly tapered tool holder or adapter 26 that carries a cutting tool 27, and a power drawbolt 28 is provided to selectively secure and retain the tool holder 26 rigidly in place in the ram.

Figure 2:
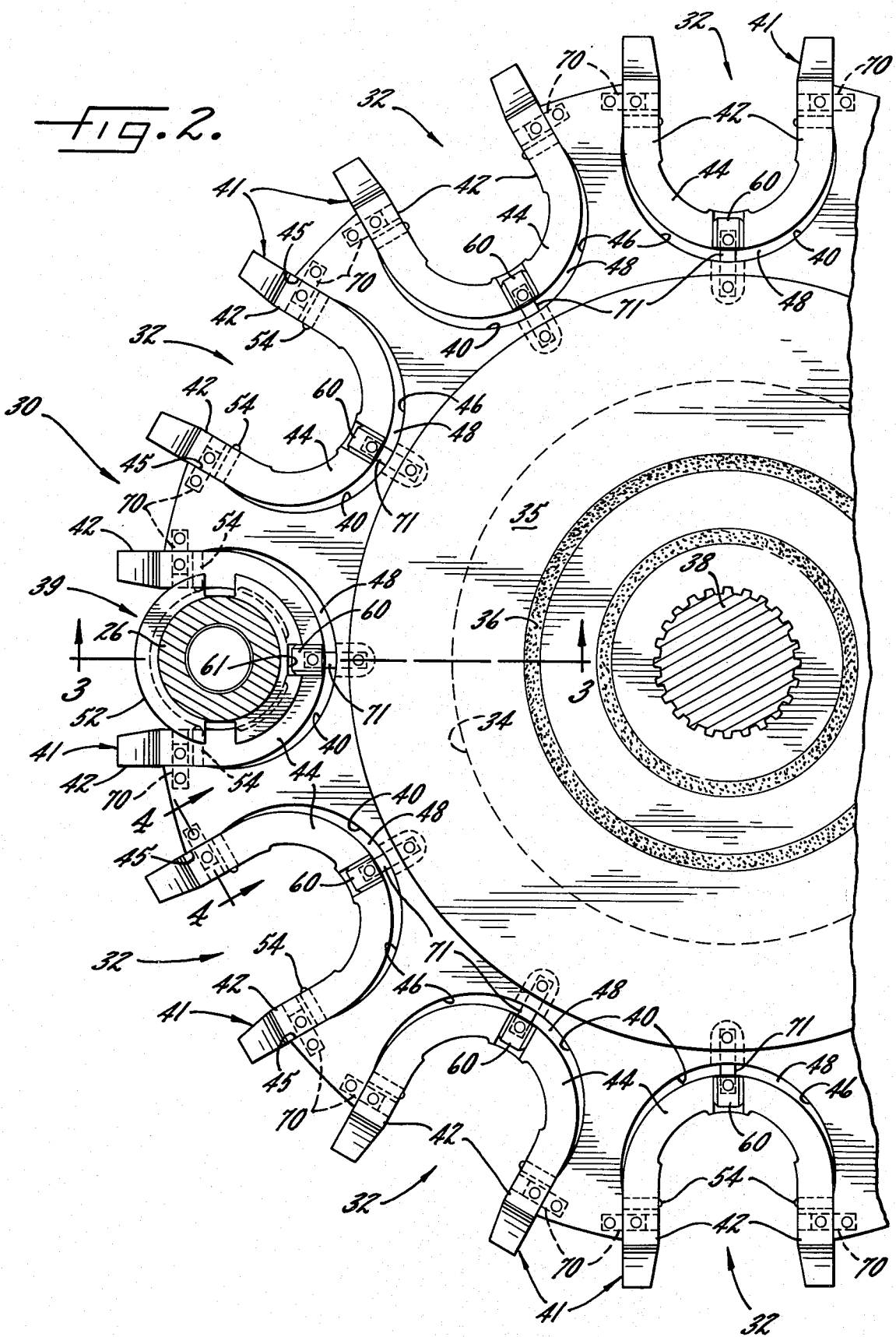
FIG. 2 is an enlarged fragmentary section of the tool storage magazine for the machine shown in FIG. 1 taken in the plane of line 2—2.

For the purpose of storing a plurality of different tools for use in the ram 24, a carrousel type tool storage magazine 30 is supported by a bracket 31 fixed in depending fashion from one end of the cross rail 19. The magazine 30 has a plurality of tool support sockets 32 about its periphery and is mounted for rotational movement about a fixed axis lying in the general plane of the vertical center line of the ram 24. The tool storage magazine 30 in this case includes a central hub 34 and an outwardly extending flat circular rim 35 secured to the hub 34 by welds 36, as shown in FIG. 3. The hub 34 is mounted for rotation on a shaft 38 that depends from the bracket 31, and suitable drive means 37 is provided for rotating the magazine 30 so that a selected tool carried in one of the sockets 32 may be positioned at a transfer station 39 (FIG. 2). All movements of the machine elements may be numerically controlled from a suitable source of programmed data in a conventional manner.

The ram 24 is shown in solid lines in FIG. 1 in a raised position without a tool. A tool change may be effected by traversing the saddle 21 and ram 24 along the cross rail 19 until the ram 24 is directly above the tool transfer station 39 at the magazine 30. The magazine 30 is then indexed to present the proper tool holder 26 to the transfer station 39. The ram may then be extended downwardly a sufficient distance to engage the tapered tool holder 26 and the power drawbolt 28 actuated to lock the tool holder into the ram. The saddle 21 and ram 24 are then traversed away from the magazine in a horizontal direction extracting the tool from the magazine, and by further prescribed movements of the saddle 21, ram 24, and rail 19, the tool may be brought to the operating zone and to the workpiece 14.

Upon completion of a machining operation, the above movements are essentially reversed. The saddle 21 and ram 24 are horizontally traversed toward the magazine to a position where the tool holder 26 carried by the ram enters an empty socket 32 of the magazine at the transfer station 39. The drawbolt 28 is then actuated to unlock the tool holder, and the ram 24 is elevated leaving the tool holder 26 positioned in the magazine. The magazine 30 may then be indexed to present a new tool to the transfer station and the cycle may be repeated.

In the event that the ram accidentally overtravels the magazine during a tool transfer operation because of a control malfunction, mechanical failure, or the like, provision is made for automatically shutting down the power drive means for the tool transfer apparatus. When a new tool is being engaged by the ram, the ram preferably is moved downwardly to a pick-up point where the ram socket is only a few thousandths of an inch short of engagement with the tapered surfaces of the tool shank. The drawbolt may then be operated to draw the shank into firm engagement with the ram socket. If the ram should continue downwardly beyond its normal pickup point, a limit switch 78 located on the bracketry 31 for the magazine 30 is actuated by the ram 24 to stop the ram drive unit 23. Similarly, in the case of horizontal overtravel of the saddle 21 during return of a tool to the storage magazine, a cam abutment 75 on the saddle will engage a limit switch 76 provided on the rail 19 which upon actuation will interrupt the feed drive of the saddle to stop further traverse of the saddle and the ram. In each case limit switches 76 and 78 preferably are positioned such that they will be actuated nearly immediately after the ram has proceeded beyond its normal pickup point.

In accordance with the present invention, the magazine sockets are provided with lost motion or breakaway shoes to protect the magazine from damage against unintended aberrations or overtravel of the ram that may occur before ram movement can be stopped by the overtravel limit switches. To this end, the magazine rim 35 is formed with a plurality of circumferentially spaced U-shaped socket recesses 40 and the sockets 32 include a generally U-shaped shoe 41 carried within each one of the recesses 40. The shoes 41 each have a pair of outwardly extending legs 42 connected by a rear curved portion 44, and the magazine recesses 40 define pairs of opposed flat surfaces 45 that mate in close relation with outside surfaces of the shoe legs 42. A curved rear portion 46 of the magazine recess 40 is of a larger diameter arc than that of the shoe 41 so that when the shoe is secured within the recess a substantial clearance space 48 exists about the entire rear curved shoe portion 44.

The tool adapter 26 is formed with an annular slot 50 that defines a recessed cylindrical surface 51 and an upper flange 52, and when the adapter is horizontally positioned by the ram 24 into a magazine socket 32 the shoe 41 engages the slot 50 and straddles the adapter to support it for storage when released by the ram. Spring-biased plungers 54 are provided on each shoe leg 42 to retain the stored tool adapter 26 in place in the magazine socket. The bias of these plungers 54 may be overpowered by the traverse of the saddle 21 when inserting a tool into the shoe or removing it from the shoe.

To facilitate positioning of a tool adapter 26 into the shoe 41, the forwardmost ends of the shoe legs 42 have outwardly tapered inner surfaces 42a and similar tapered surfaces 42b, 42c are provided on both the top and bottom sides of the legs. Such tapered leg surfaces tend to cam a tool adapter properly into position within the shoe during a tool transfer operation when the tool is slightly misaligned.

To insure proper angular orientation of a tool adapter when stored within the magazine, each shoe 41 has a key 60 centrally located on the rear curved shoe portion 44, and the upper flange 52 of each tool adapter 26 is formed with a keyway 61 adapted to engage the shoe key 60 upon its insertion into the magazine socket 32. The shoe key 60 in this case is a separate generally rectangularly shaped member secured in a recess slot 64 formed in the upper surface of the shoe. The upper and forward corners of the key 60 are formed with beveled surfaces 65, 66, respectively, which tend to cam a tool adapter 26 into engagement with the key 60.

In order to effect proper engagement of a tool holder by the ram during pickup of a new tool at the transfer station 39, it is essential that the axis of the ram socket 25 and the shank of the tool holder 26 be precisely aligned. To compensate for any slight misalignment that may exist in these axes, the cylindrical surface 51 formed by the tool adapter slot 50 preferably is 0.060 inches smaller than the width of the opening defined by the shoe legs 42 so that a 0.030 clearance on each side of the tool holder is provided. Such clearance permits the tool adapter to float horizontally under camming action of the tapered surfaces of the ram socket 25 and the tool adapter shank and effect the precise alignment necessary for reliable engagement.

In carrying out the invention, deflectable or releasable connecting means secure each shoe 41 within its recess 40 so that when the shoe is subjected to an excessive force, such as that occurring from the overtravel of the ram during a malfunction of the machine, the connecting means fractures or otherwise permits movement of the shoe relative to the magazine, thereby allowing additional travel of the tool transfer mechanism without damage to the magazine. The connecting means in this case comprises a pair of side lugs 70 and an end lug 71 each secured by screws 72 between the underside of the shoe 41 and the underside of the magazine rim 35. The shoe 41 and rim 35 are relieved on their underside so that the lugs 70, 71 do not protrude below the plane of their lower surfaces, and their upper surfaces also are countersunk so that the heads of the screws 72 are not protruding. The screws 72 in this case pass through respective apertures in the magazine rim 35 and shoes 41 and threadably engage the lugs 70, 71. The securing screws 72 passing through the rear curved portion 44 of each shoe also serve to hold the key 60 in position on the shoe, and the key 60 similarly is countersunk to contain the screw head. The lugs 70, 71 and their securing screws 72 preferably are made of such material and with such strength that they will withstand forces exerted on the socket shoes 41 during normal tool changing operations, but will not withstand significantly greater forces, such as results if there is excessive overtravel or aberration or ram movement at the magazine during a malfunction of the machine. In the event of the occurrence of such greater forces, the connecting lugs 70, 71 or screws 72, or both, may be designed to fracture, shear, bend or otherwise permit the shoe to break away from its socket recess 40 before damage can be caused to the tool changing apparatus. It will be appreciated to one skilled in the art that alternately resilient connecting means, such as durable rubber lugs or spring means, could be utilized to secure the shoes within their sockets. In such case, the resilient connecting means could be designed to deflect or give way to permit movement of the shoe relative to the socket during overtravel of the ram, and upon retraction of the ram, snap back to their original positions.

Thus, with the tool interchange system of the present invention, if during a tool transfer operation a control malfunction causes the ram to overtravel as it is being lowered in a vertical direction to engage a new tool at the magazine, the limit switch 78 will be actuated to stop the feed drive for the ram. Since a relatively small clearance space exists between the ram and the tool shank when the ram is at its normal pickup position, in some instances actuation of the limit switch 78 may not cause the overtraveling ram to be stopped quickly enough to prevent a relatively hard impact with the tool shank. In such case, excessive forces from the impact would be transmitted through the tool shank to the shoe supporting it and would cause the lugs 70, 71 to fracture, shear, or bend and thereby permit the shoe to be moved relative to the magazine or break away from the magazine in a downward direction without otherwise damaging the magazine. If the lugs 70, 71 are fractured or damaged, the shoe 41 may be quickly replaced with new lugs and the machine will again be ready for operation. Similarly, unintended overtravel of the ram 24 in the horizontal direction when returning a tool to the magazine socket 32 will actuate the overtravel limit switch 76. If the momentum of the ram nevertheless causes the tool to forcibly strike the shoe 41 in the magazine recess at the transfer station, resulting forces would again shear, fracture, or otherwise deform the lugs 70, 71 or the screws 72, or both, permitting the shoe to be moved or broken away in a rearward direction into the clearance space 48.

From the foregoing, it can be seen that the tool interchange system of the present invention will eliminate or substantially reduce damage that might otherwise occur to the machine in the event of unintended overtravel of the tool transfer mechanism at the storage magazine. While the invention has been described in connection with a vertical lathe, it will be understood that the principals of the invention are applicable to other types of machine tools with automatic tool changing mechanisms.

We claim:

1. A tool interchange system for a machine tool comprising
   a. a tool storage magazine formed with at least one socket recess,
   b. tool support means within each socket recess for removably receiving and supporting a tool,
   c. tool engaging means for engaging a tool held by said tool support means, removing said tool from said magazine for use in a machining operation, and returning the tool to said magazine upon completion of a machining operation, and
   d. yieldable and frangible connecting means for securing said tool support means within each socket recess, said connecting means when subjected to a force having a yielding point below that of said tool support means and said magazine for permitting said tool support means to be moved relative to said socket recess in the event of unintended overtravel of said tool engaging means during a tool removal or return operation prior to said tool engaging means exerting a force on said tool support means of a magnitude that would damage said magazine or tool engaging means.

2. The tool interchange system of claim 1 in which said connecting means is yieldable when subjected to forces substantially greater than the forces exerted during the normal removal and return of a tool at said magazine to permit said tool support means to be broken away from said socket recess.

3. The tool interchange system of claim 2 in which said tool engaging means is movable in a vertical direction relative to said tool storage magazine for engaging a tool in said magazine and is movable in a lateral direction relative to the magazine for returning a tool to said magazine, and said connecting means releases said shoe from said magazine socket in the event of unintentional overtravel of said engaging means relative to said magazine in either said horizontal or vertical directions.

4. The tool interchange system of claim 3 in which said connecting means is a plurality of lugs each secured at opposite ends between said shoe and said magazine, said lugs having sufficient strength to withstand forces exerted on said shoe during the normal removal and return of a tool at said magazine but insufficient strength to withstand substantially greater forces.

5. The tool interchange system of claim 4 in which relatively small screws secure said lugs to said shoes and magazine, and said screws have sufficient strength to withstand forces exerted on said shoes during the normal removal and return of a tool at said magazine but insufficient strength to withstand substantially greater forces.

6. The tool interchange system of claim 1 in which said connecting means are deflectable to permit limited movement of said tool support means relative to said socket without disengagement from said socket.

7. The tool interchange system of claim 1 in which said socket recesses each are generally U-shaped and said tool support means is a generally U-shaped shoe having a pair of outwardly extending legs and a curved rear portion, said shoes each being supported within said socket recess so that said legs are in close relation to the sides of said recess and said curved shoe portion is spaced a distance from the end of said recess so as to permit either vertical or lateral movement of said shoe relative to said magazine upon overtravel of said tool engaging means.

8. The tool interchange system of claim 7 in which each said tool comprises a cutting member and a tool adapter, said tool adapter being formed with an annular slot about its outer periphery and supported in said magazine with said shoe engaging said annular slot, and said shoes each having spring loaded plungers supported within the legs thereof for releasably engaging and retaining a tool adapter.

9. The tool interchange system of claim 7 in which each said tool comprises a cutting member and a tool adapter and the tool adapter of each tool is formed with a guide notch, and each said shoe has a key centrally located on its rear curved portion for engaging the notch of a tool adapter that is returned to said magazine to angularly orient said adapter into predetermined relation relative to said magazine.

10. The tool interchange system of claim 9 in which the outer ends of said shoe legs are formed with tapered surfaces for guiding a tool adapter being returned to said magazine into position in said shoe, and said shoe key is formed with beveled surfaces for camming said tool adapter into final angular relation.

11. The tool interchange system of claim 1 including means for automatically stopping the operation of said machine tool in the event of unintended overtravel of said tool engaging means relative to said magazine during the removal or return of a tool at said magazine.

12. The tool interchange system of claim 11 in which said tool engaging means is movable in a vertical direction relative to said tool storage magazine for engaging a tool in said magazine and is movable in a lateral direction relative to the magazine for returning a tool to said magazine, and said stopping means includes a first limit switch which is activated by movement of said tool engaging means beyond a predetermined point relative to said magazine in a horizontal direction and a second limit switch which is activated by movement of said tool engaging means in a vertical direction beyond a second predetermined position relative to said magazine.

13. The tool interchange system of claim 1 in which said tool engaging means is a tool supporting ram of a vertical lathe, said magazine being rotatably mounted about a vertical axis, and said ram being supported for vertical and horizontal movement relative to said magazine.

14. The tool interchange system of claim 1 in which said magazine is mounted for rotational movement and has a plurality of said socket recesses circumferentially spaced about its periphery.

* * * * *